United States Patent
Lin

(10) Patent No.: US 11,546,571 B1
(45) Date of Patent: Jan. 3, 2023

(54) METHOD AND SYSTEM FOR GENERATING A MULTIVIEW STEREOSCOPIC IMAGE

(71) Applicant: National Taiwan University of Science and Technology, Taipei (TW)

(72) Inventor: Tzung-Han Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 17/535,581

(22) Filed: Nov. 25, 2021

(30) Foreign Application Priority Data

Oct. 15, 2021 (TW) .................................. 110138297

(51) Int. Cl.
  *H04N 13/246* (2018.01)
  *H04N 13/296* (2018.01)
  *H04N 13/239* (2018.01)
  *H04N 13/282* (2018.01)

(52) U.S. Cl.
  CPC ......... *H04N 13/246* (2018.05); *H04N 13/239* (2018.05); *H04N 13/282* (2018.05); *H04N 13/296* (2018.05)

(58) Field of Classification Search
  CPC .. H04N 13/246; H04N 13/239; H04N 13/282; H04N 13/296
  USPC .......................................................... 348/47
  See application file for complete search history.

(56) References Cited

U.S. PATENT DOCUMENTS

| | | | |
|---|---|---|---|
| 10,049,439 B2 | 8/2018 | Inoue | |
| 10,194,089 B2 | 1/2019 | Nash et al. | |
| 10,225,545 B2 | 3/2019 | Gemayel | |
| 10,334,225 B2 | 6/2019 | Riederer | |
| 10,484,662 B2 | 11/2019 | Fattal | |
| 10,546,421 B2 | 1/2020 | Varekamp et al. | |

(Continued)

FOREIGN PATENT DOCUMENTS

| | | |
|---|---|---|
| CN | 111064945 | 4/2020 |
| CN | 112700504 | 4/2021 |
| TW | 201304511 | 1/2013 |

OTHER PUBLICATIONS

Y. Wang, et al., "CamSwarm: Instantaneous Smartphone Camera Arrays for Collaborative Photography", retrieved on Jul. 9, 2015, pp. 1-8. Available: http://arxiv.org/abs/1507.01148.

(Continued)

*Primary Examiner* — Susan E. Torgerson
(74) *Attorney, Agent, or Firm* — JCIPRNET

(57) ABSTRACT

A method and a system for generating a multiview stereoscopic image are provided. The method includes the following steps. An image capturing apparatus captures a real calibration panel to obtain multiple images, and a processor obtains a datum image and multiple images to be calibrated by analyzing the images including the real calibration panel. The processor respectively calculates a homography matrix of each of the images to be calibrated corresponding to the datum image according to the datum image and the images to be calibrated. The processor obtains a calibration matrix of the homography matrix by performing a matrix disassembly calculation on each of the homography matrices. The processor multiplies the images to be calibrated by the corresponding calibration matrix to obtain multiple calibrated images. The processor outputs the multiview stereoscopic image including the datum image and the calibrated images.

18 Claims, 6 Drawing Sheets

(56) References Cited

U.S. PATENT DOCUMENTS

2010/0103175 A1* 4/2010 Okutomi .............. H04N 13/243
  345/428
2016/0150211 A1 5/2016 Hwang et al.
2020/0027243 A1* 1/2020 Ziegler ................ H04N 13/246

OTHER PUBLICATIONS

J. Yang, et al., "Multiview image rectification algorithm for parallel camera arrays", Journal of Electronic Imaging 23 (3), 033001, May 1, 2014, pp. 033001-033001-10.

V. Nozick, "Camera array image rectification and calibration for stereoscopic and autostereoscopic displays ", Annals of Telecommunications, vol. 68, No. 11, Nov. 25, 2013, pp. 1-16.

Y. S. Kang, et al., "An efficient image rectification method for parallel multi-camera arrangement", IEEE Trans. Consum. Electron., vol. 57, No. 3, Sep. 15, 2011, pp. 1041-1048.

Y. S. Kang, et al., "Geometrical compensation algorithm of multiview image for arc multi-camera arrays", Lect. Notes Comput. Sci. (including Subser. Lec t. Notes Artif. Intell. Lect. Notes Bioinformatics), vol. 5353 LNCS, Dec. 9-13, 2008, pp. 543-552.

C. H. Hsu, et al., "CrossbowCam: a handheld adjustable multi-camera system", Multimed Tools Appl., vol. 76, No. 23, Jun. 5, 2017, pp. 24961-24981.

T. H. Lin, et al., "A camera array system based on DSLR cameras for autostereoscopic prints", Electronic Imaging 2020, Jan. 26, 2020, pp. 1-4.

Zhong-Gen Yang et al., "Linear Modeling and Reconstruction of Target's Shape from its Un-calibrated Multiple-view", IEEE ICIT 2005, Hong Kong, Dec. 2005, pp. 480-484.

"Office Action of Taiwan Counterpart Application", dated Mar. 17, 2022, p. 1-p. 7.

* cited by examiner

METHOD AND SYSTEM FOR GENERATING A MULTIVIEW STEREOSCOPIC IMAGE

CROSS-REFERENCE TO RELATED APPLICATION

This application claims the priority benefit of Taiwan application serial no. 110138297, filed on Oct. 15, 2021. The entirety of the above-mentioned patent application is hereby incorporated by reference herein and made a part of this specification.

BACKGROUND

Technical Field

The disclosure relates to a technical field of calibrating an image and outputting a multiview stereoscopic image, and more particularly, to a method and a system for generating the multiview stereoscopic image suitable for an autostereoscopic display.

Description of Related Art

One of the existing methods for capturing and calculating multiview stereoscopic images is to erect a fixed track and a photographing device sliding on the track to shoot images at different times and angles. Then, a calibration calculation is performed to obtain the multiview stereoscopic image. However, in the above method, the subject and the background must remain intact during the shooting. Therefore, the existing method is only suitable for capturing a static image, and cannot capture a momentary image. In addition, since the track must be erected first, there is room for enhancing the convenience of use of the track.

SUMMARY

The disclosure provides a method for generating a multiview stereoscopic image and a system for generating the multiview stereoscopic image, which may output the multiview stereoscopic image that has been calibrated and retains a sense of perspective.

The method for generating the multiview stereoscopic image in the embodiment of the disclosure includes the following steps. An image captured by an image capturing apparatus is received by a processor to obtain a datum image and an image to be calibrated in the image. Multiple homography matrices of each of the images to be calibrated corresponding to the datum image are calculated by the processor according to the datum image and the image to be calibrated. A matrix disassembly calculation is respectively performed, by the processor, on each of the homography matrices according to the homography matrix to obtain a calibration matrix of each of the homography matrices. Based on the calibration matrix, a calibration calculation is respectively performed, by the processor, on the images to be calibrated to obtain multiple calibrated images. The multiview stereoscopic image is outputted by the processor, and the multiview stereoscopic image includes the datum image and the calibrated images.

The system for generating the multiview stereoscopic image in the embodiment of the disclosure includes (but is not limited thereto) an image capturing apparatus and a processor. The image capturing apparatus is configured to capture an image with a real calibration panel. The processor is coupled to the image capturing apparatus. The processor is configured for receiving the image captured by the image capturing apparatus to obtain a datum image and multiple images to be calibrated in the image, respectively calculating multiple homography matrices of each of the images to be calibrated corresponding to the datum image according to the datum image and the images to be calibrated, respectively performing a matrix disassembly calculation on each of the homography matrices according to the homography matrices to obtain a calibration matrix of each of the homography matrices, respectively performing a calibration calculation on the images to be calibrated based on the calibration matrix to obtain multiple calibrated images, and outputting the multiview stereoscopic image. The multiview stereoscopic image includes the datum image and the calibrated images.

Based on the above, by disassembling the homography matrix, the affine matrix and the similarity matrix are extracted as the calibration matrix. Accordingly, the outputted multiview stereoscopic image has a smooth sense after calibration (that is, there is no position deviation) while retaining the sense of perspective, which solves an existing issue of insufficient stereoscopic sense of the stereoscopic image that results from directly multiplying by the homography matrix and the image alignment, and achieves the effect of calibration between the images.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
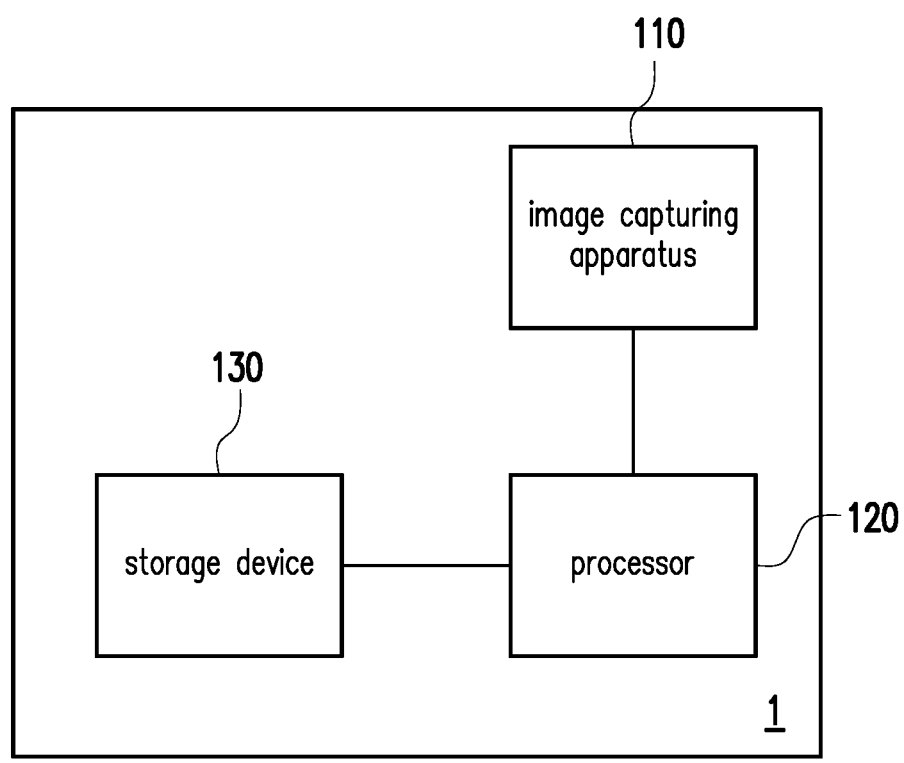
FIG. 1 is a block view of a system for generating a multiview stereoscopic image according to an embodiment of the disclosure.

FIG. 1 is a block view of a system for generating a multiview stereoscopic image according to an embodiment of the disclosure. Referring to FIG. 1, a system 1 for generating a multiview stereoscopic image includes an image capturing apparatus 110 and a processor 120. Here, the processor 120 is coupled to the image capturing apparatus 110 through a wired connection or a wireless connection. That is, the image capturing apparatus 110 communicates with the processor 120 through wired transmission or wireless transmission, so that the processor 120 may receive data from the image capturing apparatus 110.

In another embodiment, the system 1 for generating the multiview stereoscopic image further includes a storage device 130 and a multiview stereoscopic image display. The processor 120 is coupled to the storage device 130 and the multiview stereoscopic image display through a wired connection or a wireless connection. That is, the storage device 130 and the multiview stereoscopic image display communicate with the processor 120 through wired transmission or wireless transmission, so that the processor 120 may access the data from the storage device 130 and transmit the data to the multiview stereoscopic image display.

The image capturing apparatus 110 is, for example, a video camera, a camera, or the like that uses a charge coupled device (CCD) lens and a complementary metal oxide semiconductor transistor (CMOS) lens.

The processor 120 is, for example, a central processing unit (CPU), a graphic processing unit (GPU), a physics processing unit (PPU), a programmable microprocessor, an embedded control chip, a digital signal processor (DSP), an application specific integrated circuit (ASIC), or other similar apparatuses.

The storage device 130 may be any type of fixed or removable random access memory (RAM), read only memory (ROM), flash memory, traditional hard disk drive (HDD), solid-state drive (SSD), or similar components. In an embodiment, the storage device 130 is configured to store a program code, a software module, configuration, data (for example, an image, an image to be calibrated, a datum image, a calibrated image, a homography matrix, a calibration matrix, or the multiview stereoscopic image), or a file. In this embodiment, the storage device 130 may be coupled to a printing output apparatus to output the multiview stereoscopic image outputted by the processor through a printing apparatus. The printing apparatus may be a lenticular printing apparatus.

The multiview stereoscopic image display may be an autostereoscopic display without glasses, a temporal multiplexed stereoscopic display, a spatial multiplexed stereoscopic display, a head mount display, a depth-fused multilayer screen, a holographic display, a volumetric display, and/or other types of suitable displays, or may be an electronic apparatus with the foregoing displays. However, the disclosure is not limited thereto. In this embodiment, the multiview stereoscopic image display displays the multiview stereoscopic image outputted by the processor to present the multiview stereoscopic image after a calibration processing and/or translation processing in real-time. The printing apparatus may be the lenticular printing apparatus.

Figure 2:
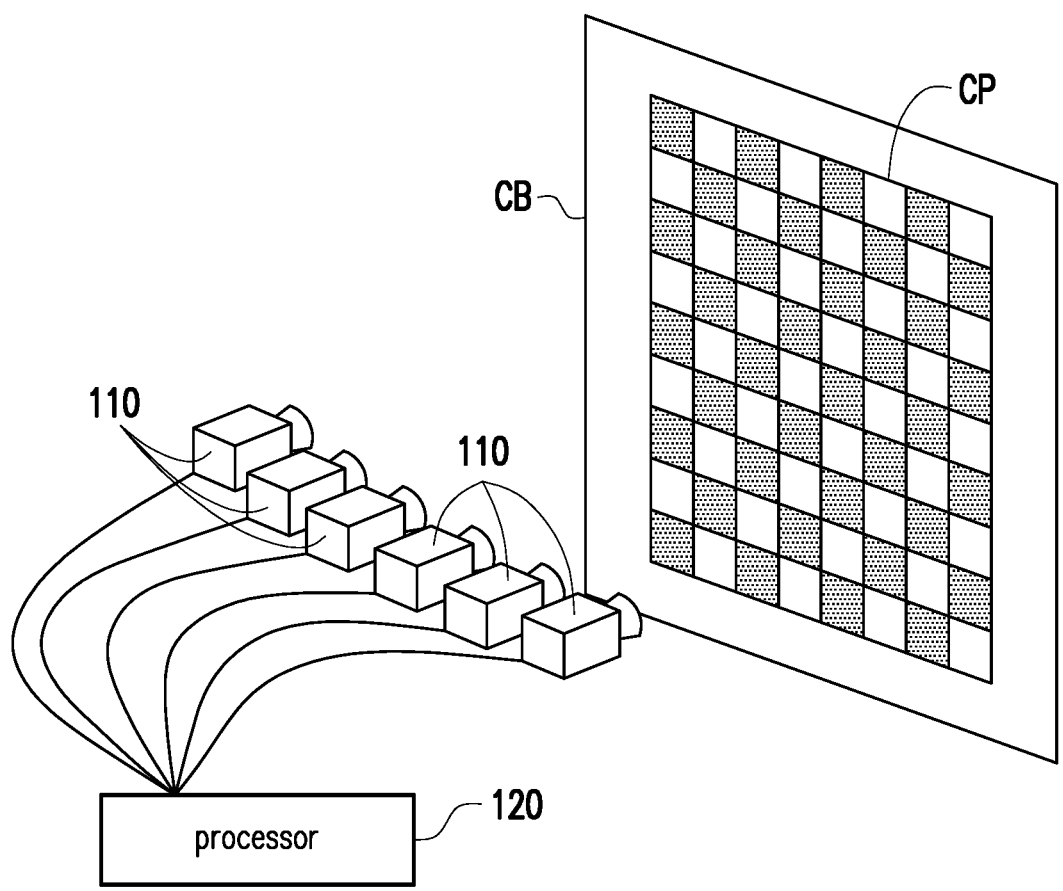
FIG. 2 is a schematic view of a system for generating a multiview stereoscopic image according to an embodiment of the disclosure.

FIG. 2 is a schematic view of a system for generating a multiview stereoscopic image according to an embodiment of the disclosure. In the system 1 for generating the multiview stereoscopic image, multiple images are captured by using the image capturing apparatuses 110. The images are images obtained by capturing an image with a real calibration panel CB at different angles. The processor 120 calculates a homography matrix of the image relative to the datum image by calculating the above images, and then further disassembles the homography matrix of each of the images into affine, perspective, and similarity matrices. Based on a feature of using the affine matrix and the similarity matrix as a calibration matrix, the multiview stereoscopic image outputted by the system 1 and a method for generating the multiview stereoscopic image has a smooth sense after calibration and maintains a sense of perspective. Here, a pattern on a plane of the real calibration panel CB is, for example, a regular color checkerboard pattern CP, and may also be a wall surface with a recognizable pattern. However, the disclosure is not limited thereto.

In addition, in other embodiments, the processor 120 may be disposed in the image capturing apparatus 110. In addition, in other embodiments, the image capturing apparatus 110, the processor 120, and the storage device 130 may also be integrated into the same apparatus, such as a personal computer, a notebook computer, a smart phone, and a tablet computer having camera, photography, and projection functions. However, the disclosure is not limited thereto.

Figure 3:
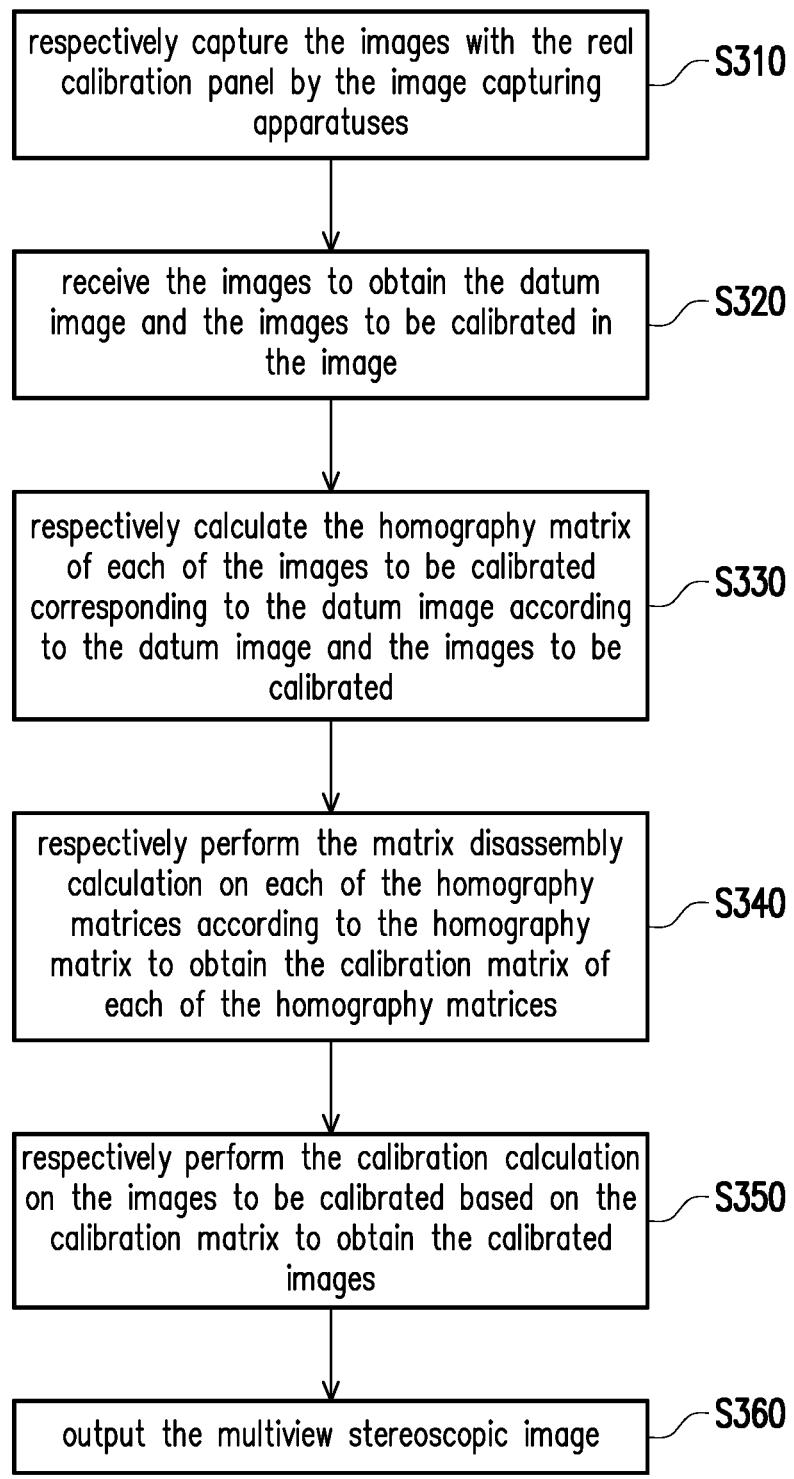
FIG. 3 is a flowchart of a method for generating a multiview stereoscopic image according to the disclosure.

Hereinafter, each of steps in the method for generating the multiview stereoscopic image of the disclosure are described with the system 1 for generating the multiview stereoscopic image. FIG. 3 a flowchart of a method for generating a multiview stereoscopic image according to the disclosure. Referring FIGS. 1 to 3, in step S310, the image capturing apparatuses 110 respectively capture the images with the real calibration panel, and the images are the images including the real calibration panel CB. Specifically, the image capturing apparatuses 110 are adjacent to one another, and the adjacent image capturing apparatuses in the image capturing apparatuses 110 have an included angle between 0.5 degrees and 10 degrees. In this embodiment, the image capturing apparatuses 110 are disposed horizontally. That is, the image capturing apparatuses 110 are disposed on the same level, and each of the image capturing apparatuses 110 shoots/captures the image with a calibration plane (the real calibration panel CB) for calibration at the same moment. For example, when the number of image capturing apparatuses 110 is 6, each of the image capturing apparatuses 110 captures one image, so the image capturing apparatuses 110 output 6 images to the processor 120. In this embodiment, the included angle between the adjacent image capturing apparatuses 110 is 0.9 degrees to 1.1 degrees, so that method and the system for generating the multiview stereoscopic image of the disclosure may output the multiview stereoscopic image that is visually smoother and has the stereoscopic effect. After the images including the real calibration panel CB are captured by the image capturing apparatus 110, and the images are transmitted to the processor 120, step S320 is performed.

In step S320, the processor 120 receives the images captured by the image capturing apparatuses 110 to obtain the datum image and the images to be calibrated in the images. Specifically, the processor 120 receives the images captured by the image capturing apparatuses 110, and the processor 120 analyzes the images to obtain the datum image and the images to be calibrated from the images. For example, when the number of the image capturing apparatuses 110 is an odd number, the datum image is the image shot/captured by the image capturing apparatus 110 in the middle. On the other hand, when the number of image capturing apparatuses 110 is an even number, the two images are captured by the two image capturing apparatuses 110 that are closest to the middle in the image capturing apparatuses 110, and the image obtained by performing an interpolation calculation on the above two images is used as the datum image. The interpolation calculation will be described below. Then, after the processor 120 analyzes the datum image, the rest of the images are all the images to be calibrated. In addition, after the processor 120 obtains the datum image and the images to be calibrated, step S330 is performed.

In step S330, the processor 120 respectively calculates the homography matrices of each of the images to be calibrated corresponding to the datum image according to the datum image and the images to be calibrated. When each of the images is captured, the image thereof includes the real calibration panel. In addition, the pattern of the real calibration panel CB is, for example, the regular checkerboard pattern CP. However, the disclosure is not limited thereto. It is worth noting that, in this embodiment, the color pattern is printed on the real calibration panel. Therefore, the processor 120 may perform position calibration conversion and color calibration conversion of a feature point in the image on the images to be calibrated and the datum image through the color pattern on the real calibration panel. In the disclosure, the color calibration is not limited to the color of the datum image, but after the color calibration and conversion, there is no color difference between the datum image and the images to be calibrated, which belongs to the color calibration and conversion mentioned in the disclosure. It is worth noting that the disclosure has an effect of using the same real calibration panel CB (i.e., a calibration panel) to complete the position and color calibration, and in an actual operation, the color pattern is printed on the wall or the panel placed near a photographer, which may be used as the real calibration panel CB of the disclosure. Specifically, the processor 120 uses a feature detection method to find multiple feature points x'$_i$ in the images to be calibrated and the datum image. In terms of the checkerboard pattern CP, black and white corners in the checkerboard are the so-called feature points.

Next, a homography matrix H is, for example, a 3×3 matrix. Here, the homography matrix is used to describe a projection conversion between a plane coordinate captured by the image capturing apparatus 110 and the datum image. The homography matrix H is used to describe a projection calculation from a plane to another plane in a homogenous coordinate. For example, the 3×3 matrix is used to represent the homography matrix H as in Formula (1), where $$x'_i \text{ is } \begin{pmatrix} x'_i \\ y'_i \\ w'_i \end{pmatrix} \text{ in Formula (1); } H \text{ is } \begin{bmatrix} h_{11} & h_{12} & h_{13} \\ h_{21} & h_{22} & h_{23} \\ h_{31} & h_{32} & h_{33} \end{bmatrix}, \text{ and } x \text{ is } \begin{pmatrix} x_i \\ y_i \\ w_i \end{pmatrix}.$$

In other words, the homography matrix H is a mapping transformation between the feature points in the images to be calibrated and the feature points in the datum image. Next, in order to solve the homography matrix H, assuming that a feature point of the coordinate of the image capturing apparatus 110 is $x_i$, after being mapped to the coordinate ($Hx_i$) of the known datum image, an outer product of the feature point x'$_i$ in the known datum image is a zero vector, as shown in Formula (2), which represents a minimization formula of an expected distance between a point coordinate (i.e., $Hx_i$) of the feature points of the images to be calibrated after being transformed by the homography matrix and the feature points of the datum image (i.e., x'$_i$). That is, assuming that the outer product between two vectors is zero, it is deemed to satisfy a condition of the distance.

$$\begin{pmatrix} x'_i \\ y'_i \\ w'_i \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} x_i \\ y_i \\ w_i \end{pmatrix} \quad \text{Formula (1)}$$

$$x'_i \times Hx_i = [0 \ 0 \ 0]^T \quad \text{Formula (2)}$$

In addition, Formula (1) and Formula (2) may be rewritten and simplified into Formula (3) and Formula (4), and finally the homography matrix H is solved by a singular value decomposition (SVD). The existing singular value decomposition (SVD) method may be used to organize Formula (2), and then a value of H may be calculated. In more detail, the specific method of organizing Formula (2) is to disassemble the matrix H is into row vectors individually. For example, $h_1^T$ in Formula (3) is the first row of matrix H. In other words, the row vectors of the homography matrix H are respectively represented as $h_1^T$, $h_2^T$, and $h_3^T$. Furthermore, by organizing Formula (3) into Formula (4), the SVD calculation may be performed on the left matrix in Formula (4) to calculate $h_1$, $h_2$, and $h_3$ (i.e., H), where $x_i$, $y_i$, and $w_i$ in Formula (4) are respectively scalars, which are three components of actual values of the feature points of the datum image.

$$Hx_i = \begin{bmatrix} h_{11} & h_{12} & h_{13} \\ h_{21} & h_{22} & h_{23} \\ h_{31} & h_{32} & h_{33} \end{bmatrix} \quad \text{Formula (3)}$$

$$\begin{bmatrix} x_i \\ y_i \\ w_i \end{bmatrix} = \begin{bmatrix} h_{11}x_i + h_{12}y_i + h_{13}w_i \\ h_{21}x_i + h_{22}y_i + h_{23}w_i \\ h_{31}x_i + h_{32}y_i + h_{33}w_i \end{bmatrix} = \begin{bmatrix} h_1^T x_i \\ h_2^T x_i \\ h_3^T x_i \end{bmatrix}$$

$$\begin{bmatrix} 0^T & -w'_i x_i^T & y'_i x_i^T \\ w'_i x_i^T & 0^T & -x'_i x_i^T \end{bmatrix} \begin{pmatrix} h_1 \\ h_2 \\ h_3 \end{pmatrix} = 0 \quad \text{Formula (4)}$$

When the homography matrix H is calculated, it is equivalent to a regression matrix. Therefore, according to the homography matrix H, any point $x_i$ on a coordinate system captured by the image capturing apparatus 110 is multiplied by the homography matrix H to calculate a coordinate value x'$_i$ of the known coordinate system.

The processor 120 calculates the homography matrix H of each of the images to be calibrated corresponding to the datum image according to the above formulas, and then step S340 is performed.

In addition, in step S340, the processor 120 respectively performs a matrix disassembly calculation on each of the homography matrices according to the homography matrix, so as to obtain a calibration matrix of each of the homography matrices H. The homography matrix H includes a matrix combination of image rotation, translation, scaling, affine, and perspective projection. In step S340, the following steps are further included. The processor 120 disassembles each of the homography matrices H into the perspective matrix, the similarity matrix, and the affine matrix according to the matrix disassembly calculation, and the processor 120 uses the similarity matrix and the affine matrix as the above calibration matrix. Furthermore, the homography matrix H may be disassembled into a perspective transformation matrix $H_P$, an affine transformation matrix $H_A$, and a similarity transformation matrix $H_S$, that is, as shown in Formula (5).

$$H = H_S H_A H_P = \begin{bmatrix} sR & t \\ 0^T & 1 \end{bmatrix} \begin{bmatrix} K & 0 \\ 0^T & 1 \end{bmatrix} \begin{bmatrix} I & 0 \\ v^T & v \end{bmatrix} \quad \text{Formula (5)}$$

After the processor 120 calculates a calibration matrix of each of the images to be calibrated relative to the datum image, then step S350 is performed. In step S350, based on the calibration matrix, the processor 120 respectively performs a calibration calculation on the images to be calibrated to obtain multiple calibrated images. Specifically, the calibration calculation is to multiply each of the images to be calibrated by the corresponding calibration matrix to obtain the calibrated image. Next, step S360 is performed. In step S360, the processor 120 outputs the multiview stereoscopic image. The multiview stereoscopic image includes the datum image and the calibrated images. It should be mentioned that by using the affine transformation matrix $H_A$ and the similarity transformation matrix $H_S$ as the calibration matrix, a transformed image of the image to be calibrated still retains a perspective effect. In this way, the multiview stereoscopic image outputted by the system 1 and the method for generating the multiview stereoscopic image retains the perspective effect, while through the technology that the calibration matrix is the affine transformation matrix $H_A$ and the similarity transformation matrix $H_S$, the multiview stereoscopic image presents gradual images that have the same positions of the feature points to achieve the visually good and smooth stereoscopic effect.

In another embodiment, in step S330, it further includes that the processor 120 respectively performs a pivot calibration processing on the images to be calibrated and the datum image. The pivot calibration processing is to perform a calculation according to a pivot matrix. Next, the processor 120 performs the calculation on the images to be calibrated after the pivot calibration processing to calculate the homography matrix H of each of the images to be calibrated corresponding to the datum image after the pivot calibration processing.

Then, in step S350, it further includes that the processor 120 respectively performs the calibration calculation and a compensation calculation on the images to be calibrated to obtain the calibrated images. The compensation calculation is to perform a calculation according to an inverse matrix of the pivot matrix. Specifically, the pivot calibration processing is to first translate the images to be calibrated and the datum image to an original point according to a central point of the calibration panel in image contents of the images to be calibrated and the datum image, and then perform the subsequent calibration calculation using the homography matrix. In addition, the compensation calculation is performed on the images after the calibration calculation and the datum image to translate the images (for example, the central point of the calibration panel) to an initial position. In other words, the compensation calculation is to compensate a pivot translation matrix of the pivot calibration processing to an original position. In another embodiment, the compensation calculation is multiplied by an inverse matrix of the datum image (for example, a $T_{src}^{-1}$ matrix in this embodiment).

For example, a center of the homogenous coordinate of the image to be calibrated is $(x_{src}, y_{src}, 1)$, and a calculation method of the center of the coordinate may obtain an average of all the feature points, which is a matrix $T_{src}$ (i.e., a compensation matrix). In other words, the compensation matrix $T_{src}$ is a translation matrix of central points of the images to be calibrated respectively, as shown in Formula (6), and the inverse matrix $T_{src}^{-1}$ of $T_{src}$ is as shown in Formula (7).

$$T_{src} = \begin{bmatrix} 1 & 0 & x_{src} \\ 0 & 1 & y_{src} \\ 0 & 0 & 1 \end{bmatrix} \quad \text{Formula (6)}$$

$$T_{src}^{-1} = \begin{bmatrix} 1 & 0 & -x_{src} \\ 0 & 1 & -y_{src} \\ 0 & 0 & 1 \end{bmatrix} \quad \text{Formula (7)}$$

Next, the central point of the image to be calibrated is $(x_{dst}, y_{dst}, 1)$, and a matrix $T_{dst}$ thereof is as shown in Formula (8) and an inverse matrix of $T_{dst}$ is $T_{dst}^{-1}$ (i.e., the pivot matrix). In other words, the pivot matrix is an inverse matrix of the centers of the homogenous coordinates of the images to be calibrated, as shown in Formula (9).

$$T_{dst} = \begin{bmatrix} 1 & 0 & x_{dst} \\ 0 & 1 & y_{dst} \\ 0 & 0 & 1 \end{bmatrix} \quad \text{Formula (8)}$$

$$T_{dst}^{-1} = \begin{bmatrix} 1 & 0 & -x_{dst} \\ 0 & 1 & -y_{dst} \\ 0 & 0 & 1 \end{bmatrix} \quad \text{Formula (9)}$$

In light of the above, in this embodiment, the homography matrix of the calibration panel between the images to be calibrated and the datum image is H (that is, mapping from the image to be calibrated to the datum image). Then, the homography matrix required for the pivot calibration processing is $T_{dst}^{-1}HT_{src}$. That is, an object of the matrix that is disassembled is $T_{dst}^{-1}HT_{src}$. In other words, the $T_{dst}^{-1}HT_{src}$ matrix is disassembled into the following formula, as in Formula (10).

$$T_{dst}^{-1}HT_{src} = H_S H_A H_P = \left[\begin{bmatrix} sR & t \\ 0^T & 1 \end{bmatrix}\begin{bmatrix} K & 0 \\ 0^T & 1 \end{bmatrix}\begin{bmatrix} I & 0 \\ v^T & v \end{bmatrix}\right] = \begin{bmatrix} A & t \\ v^T & v \end{bmatrix} \text{Formula (10)}$$

In other words, $H_S$ and $H_A$ are the similarity transformation matrix and the affine transformation matrix from the $T_{dst}^{-1}HT_{src}$ matrix.

Since, in this embodiment, the calibration matrix (i.e., $H_S$ and $H_A$) is derived from the $T_{dst}^{-1}HT_{src}$ matrix, the homography matrix after the pivot calibration is $T_{dst}H_SH_AT_{src}^{-1}$ to compensate for translation of $T_{dst}^{-1}$ and $T_{src}$ in $T_{dst}^{-1}HT_{src}$ when extracting the calibration matrix ($H_S$ and $H_A$).

For example, assuming that the image to be calibrated is an $I_{src}$ matrix, the corrected image is an $I_{new}$ matrix, as shown in Formula (11) as follows.

$$I_{new} = T_{dst}H_SH_AT_{src}^{-1}I_{src} \quad \text{Formula (11):}$$

The homography matrix is that when the image is multiplied by the pivot translation matrix of the pivot calibration processing, the central point of the image (for example, the feature point of the real calibration panel) will overlap an origin of a quadrant. Then, the calibration calculation is performed on the image after the pivot calibration processing, and then the image after the pivot calibration processing is multiplied by an inverse matrix of the pivot translation matrix to translate back to the original position. In this way, the image that is processed through the pivot calibration processing before the calibration calculation may avoid the image bias during the calibration processing and the situation that a part of the image is enlarged in an unequal proportion. As a result, the output multiview stereoscopic image is relatively stable and harmonic. It should be mentioned that the central point and the center of the coordinate mentioned in the disclosure may be the center of the feature point of the real calibration panel presented (i.e., captured) in the image to be calibrated or the datum image.

Figure 4:
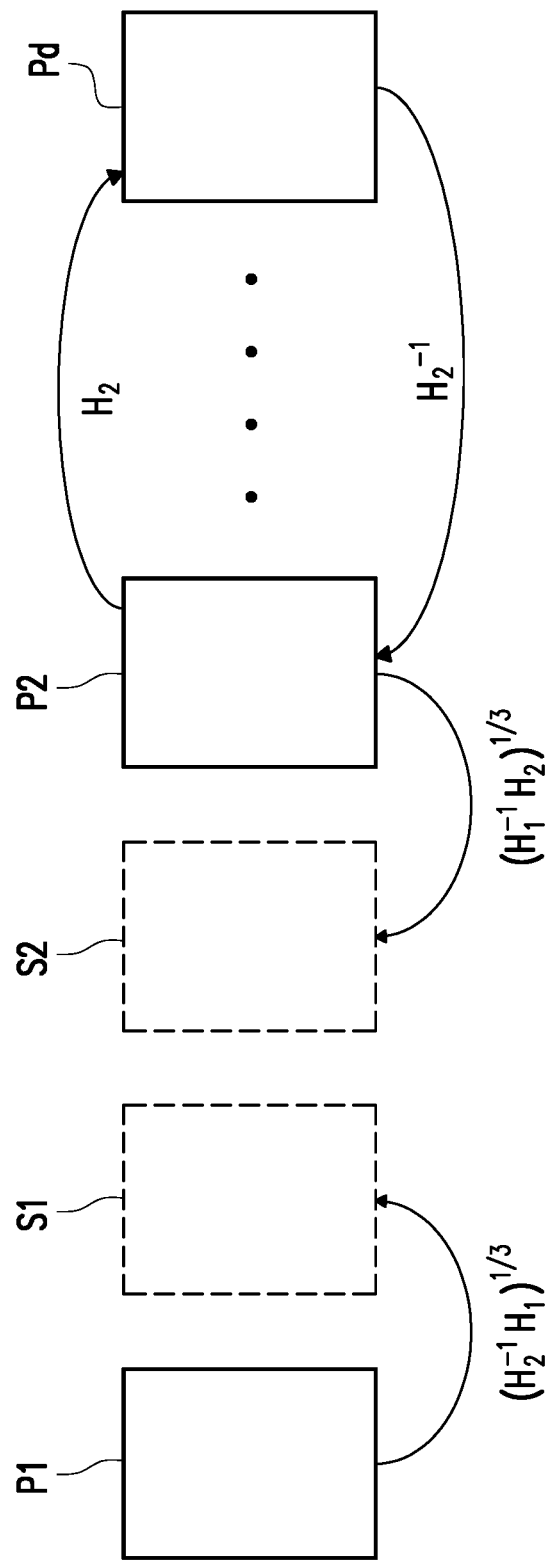
FIG. 4 is a schematic view of an interpolation calculation according to the disclosure.

In another embodiment, in step S360, it further includes that the processor 120 performs the interpolation calculation on every two images adjacent to each other in the datum image and the calibrated images to obtain multiple virtual images. Then, the processor 120 outputs the multiview stereoscopic image, and the multiview stereoscopic image includes the datum image, the calibrated images, and the virtual images. Next, the processor 120 performs the calculation on the images to be calibrated after the pivot calibration processing to calculate the homography matrix H of each of the images to be calibrated corresponding to the datum image after the pivot calibration processing. FIG. 4 is a schematic view of an interpolation calculation according to the disclosure. A first image to be calibrated P1, a second image to be calibrated P2, and a datum image Pd are taken as examples for illustration. $I_1$ is image data of the first image to be calibrated P1. $I_2$ is the image data of the second image to be calibrated P2. $I_{S1}$ and $I_{S2}$ are image data of interpolated images (i.e., virtual images S1 and S2) between the image to be calibrated P1 and the second image to be calibrated P2 at three equal intervals, and formulas of the projection conversion therebetween are as shown in Formula (12) and Formula (13). In the disclosure, through the technology of the interpolation calculation, the system 1 and the method for generating the multiview stereoscopic image of the disclosure are provided with a small number of image capturing apparatuses to calculate the multiview stereoscopic image including the calibrated images and the virtual images. As a result, advantages of low cost of disposition and output of the high stereoscopic multiview stereoscopic image are achieved.

$$I_{s1}=(H_2^{-1}H_1)^{1/3}I_1 \quad \text{Formula (12):}$$

$$I_{s2}=(H_1^{-1}H_2)^{1/3}I_2 \quad \text{Formula (13):}$$

In another embodiment, in step S360, it further includes that the processor 120 respectively performs the translation processing on the calibrated images to obtain the calibrated image after translation. In more detail, the calibrated images and the datum image are arranged in order according to a relative position of the corresponding image capturing apparatus. In addition, the translation processing is that the calibrated images are multiplied by the N translation matrices according to the N relative distances between the calibrated images and the datum image. Specifically, N is a positive integer. If the calibrated images are located on a right side of the datum image (that is, the relative position of the corresponding image capturing apparatus 110), the calibrated images are multiplied by the N translation matrices. if the calibrated images are located on a left side of the datum image, the calibrated images are multiplied by the inverse matrix of the N translation matrices. In this way, the system and the method for generating the multiview stereoscopic image of the disclosure perform the translation processing on the calibrated images, so that the entire image of the multiview stereoscopic image outputted by the system and the method for generating the multiview stereoscopic image is further enlarged and has more stereoscopic effect. In another embodiment, a user may also translate the entire image of the outputted multiview stereoscopic image to the middle by perform the translation processing on the calibrated images, so that the visual stereoscopic effect of the entire image of the outputted multiview stereoscopic image is relatively smooth and flat.

Figure 5:
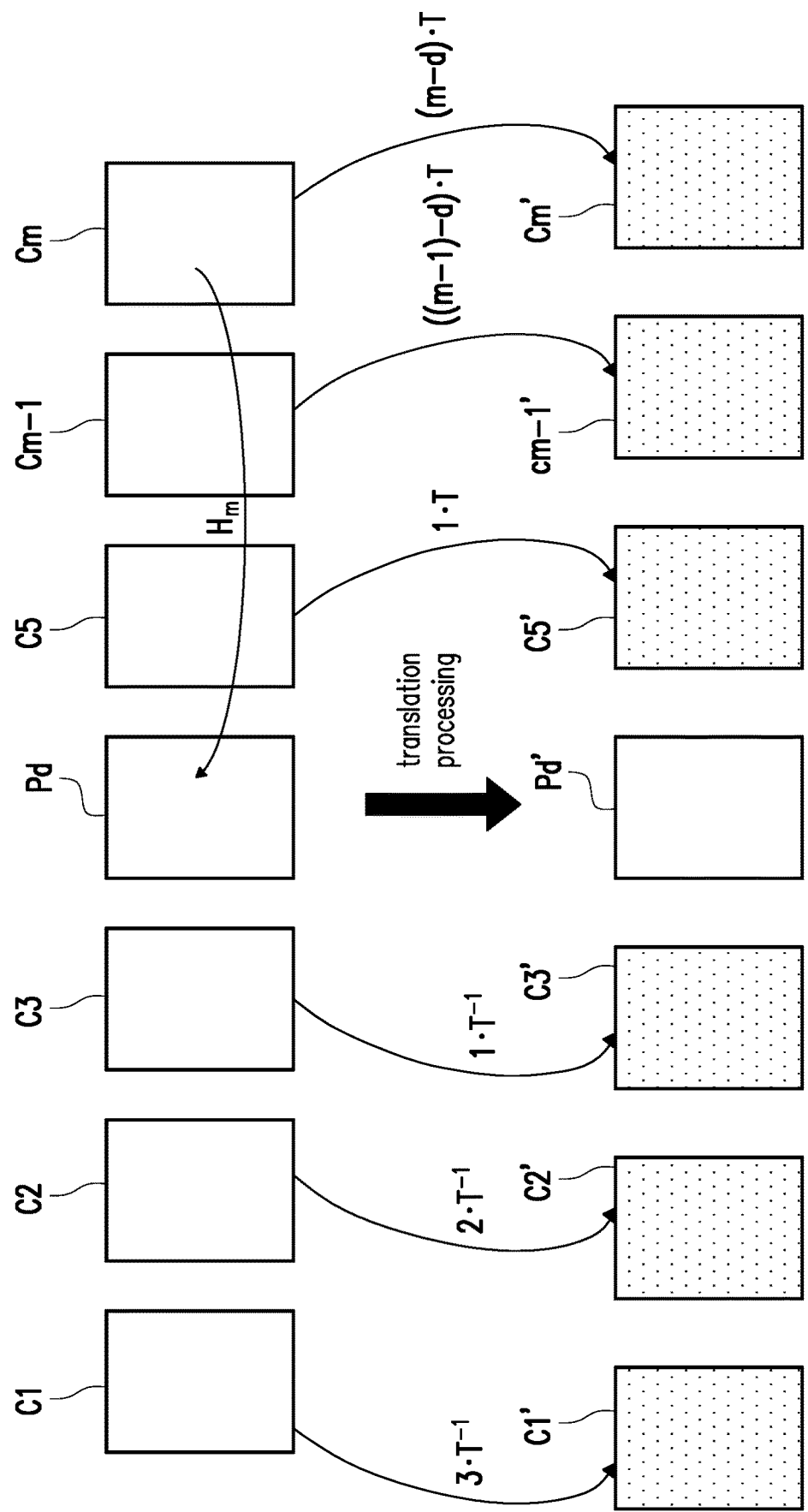
FIG. 5 is a schematic view of a translation processing according to the disclosure.

FIG. 5 is a schematic view of a translation processing according to the disclosure. As shown in FIG. 5, for example, in this embodiment, the total number of the calibrated images and a datum image Pd is 7, and a translation matrix T is as shown in Formula (14). Then, the datum image in this embodiment is the fourth image arranged in order, so d of the datum image Pd is equal to 4. Next, taking a m-th calibrated image Cm as an example, since the number of the images in this embodiment is 7, the m-th calibrated image Cm is the seventh image arranged in order. The relative distance between the m-th calibrated image and the datum image Pd is 3, so the m-th calibrated image is multiplied by the 3 translation matrices T. When the i-th calibrated image is located on a left side of the datum image Pd, a translation matrix T' is an inverse matrix $T^{-1}$ of the translation matrix T, and a formula of a translation matrix T' is as shown in Formula (15). In other words, a first calibrated image C1 is located on the left side of the datum image Pd (i.e., i is less than d), and then the first calibrated image C1 is multiplied by the 3 translation matrices T.

$$T = \begin{bmatrix} 1 & 0 & 3 \\ 0 & 1 & 0 \\ 0 & 0 & 1 \end{bmatrix} \quad \text{Formula (14)}$$

$$T' = \begin{cases} T, & i > d \\ T^{-1}, & i < d \end{cases} \quad \text{Formula (15)}$$

It should be mentioned that in the above embodiment, the translation matrix T is taken as an example with 3 pixels. Therefore, a unit increment of the translation matrix may be adjusted from 1 to any number of the pixels according to user requirement. For example, if the incremental unit of the translation matrix is 2, in a matrix array of Formula (13), 3 is replaced with 2, and the rest may be derived by analog.

Figure 6:
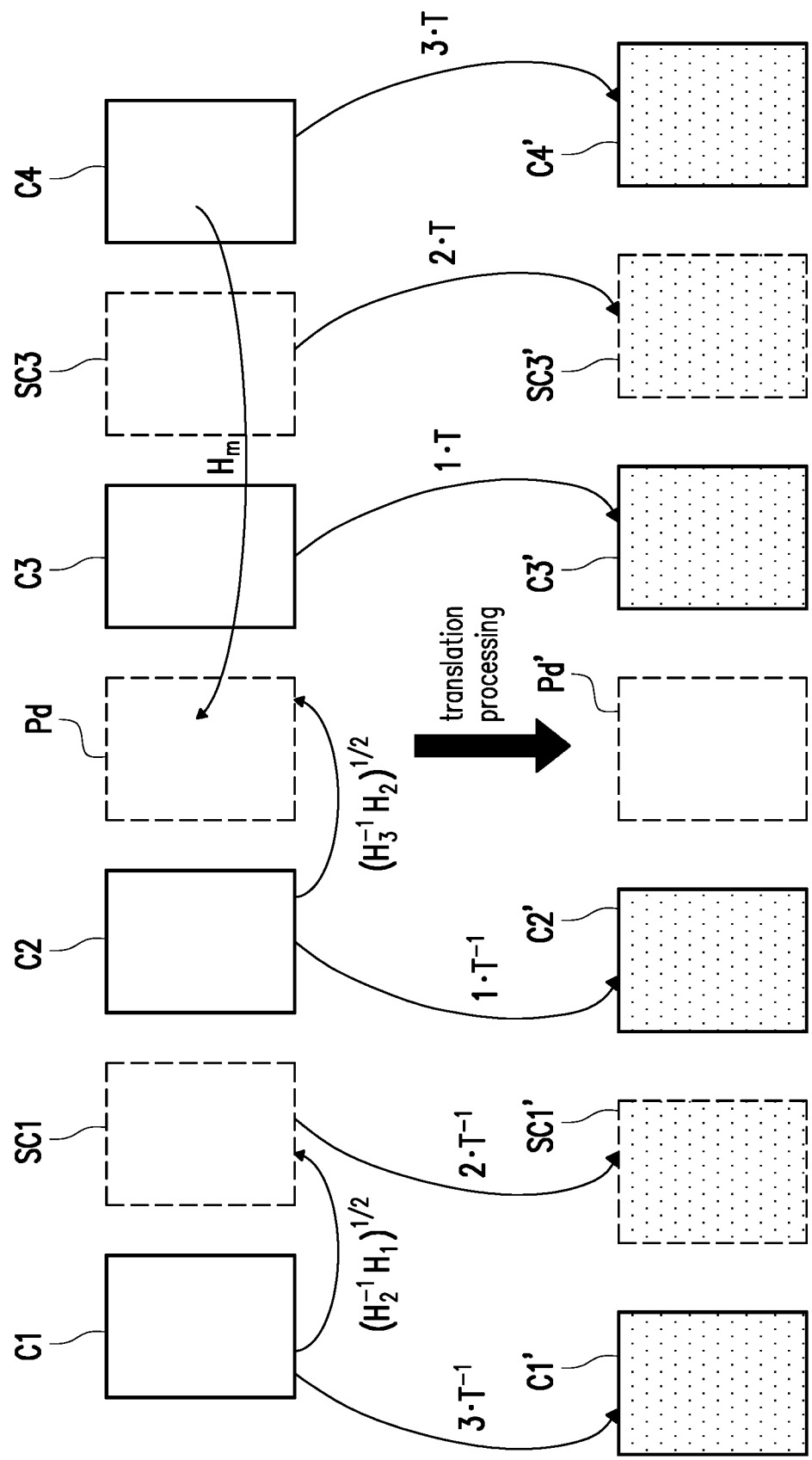
FIG. 6 is a schematic view of an interpolation calculation and a translation processing according to the disclosure.

In another embodiment, in step S360, it further includes that the processor 120 respectively performs the translation processing on the calibrated images and the virtual image to obtain the calibrated images after the translation processing and the virtual images after the translation processing. FIG. 6 is a schematic view of an interpolation calculation and a translation processing according to the disclosure. As shown in FIG. 6, in this embodiment, the number of the image capturing apparatus is 4. Therefore, the number the calibrated images (C1, C2, C3, and C4) after the calibration processing is four, and the number of virtual images (SC1, Pd', and SC3) obtained by the above interpolation calculation is three. In addition, in this embodiment, the datum image Pd' is the datum image Pd' obtained by the second image to be calibrated and a third image to be calibrated after the interpolation calculation. In light of FIG. 6, a distance between a fourth calibrated image C4 and the datum image Pd' is 3. Therefore, the fourth calibrated image C4 is multiplied by the three translation matrices T to complete the translation processing. Then, the processor 120 outputs the multiview stereoscopic image including the calibrated images (C1', C2', C3', and C4) after the translation processing, the virtual images (SC1' and SC3') after the translation processing, and the datum image Pd'. It should be mentioned that a distance between the image capturing apparatus 110 and the subject may be set to 1 to 3 meters in the system and the method for generating the multiview stereoscopic image of the disclosure in actual use. More preferably, the distance of the image capturing apparatus 110 and the subject is 2.5 meters to 3 meters. However, the disclosure may also be applied to the shooting of natural landscapes (the distance greater than 3 meters, or farther). Therefore, the present application should not be limited thereto.

Based on the above, in the system and the method for generating the multiview stereoscopic image in embodiment of the disclosure, by disassembling the homography matrix into the perspective transformation matrix, the affine transformation matrix, and the similarity transformation matrix, the affine transformation matrix and the similarity transformation matrix are used as the calibration matrix in the disclosure. In this way, the images in the multiview stereoscopic image outputted by the system and the method for generating the multiview stereoscopic image in embodiment of the disclosure are calibrated by the calibration panel, while maintaining the perspective effect. In addition, by the pivot calibration processing and the translation processing, the multiview stereoscopic image may be more stable, and the stereoscopic effect thereof may be adjusted according to the user and actual usage. It is worth noting that by the interpolation calculation, the multiview stereoscopic image of the disclosure may be provided with a small number of image capturing apparatuses (for example, the cameras) to output the calibrated images, so that the calculation processing is less and the calculation time is faster. As a result, the effect of presenting or outputting stereoscopic photos in real-time after shooting is achieved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A system for generating a multiview stereoscopic image, comprising:
    a plurality of image capturing apparatuses capturing a plurality of images with a real calibration panel; and
    a processor coupled to the image capturing apparatuses, wherein the processor is configured for:
    receiving the images captured by the image capturing apparatuses to obtain a datum image and a plurality of images to be calibrated in the images;
    respectively calculating a plurality of homography matrices of each of the images to be calibrated corresponding to the datum image according to the datum image and the images to be calibrated;
    respectively performing a matrix disassembly calculation on each of the homography matrices according to the homography matrices to obtain a calibration matrix of each of the homography matrices;
    based on the calibration matrix, respectively performing a calibration calculation on the images to be calibrated to obtain a plurality of calibrated images; and
    outputting the multiview stereoscopic image, wherein the multiview stereoscopic image comprises the datum image and the calibrated images.

2. The system for generating the multiview stereoscopic image according to claim 1, wherein respectively performing, by the processor, the matrix disassembly calculation on each of the homography matrices according to the homography matrices to obtain the calibration matrix of each of the homography matrices comprises that the processor is further configured for:
    disassembling each of the homography matrices into a perspective matrix, a similarity matrix, and an affine matrix by performing the matrix disassembly calculation; and
    using the similarity matrix and the affine matrix as the calibration matrix.

3. The system for generating the multiview stereoscopic image according to claim 1, wherein respectively calculating the homography matrices of each of the images to be calibrated corresponding to the datum image according to the datum image and the images to be calibrated comprises that the processor is further configured for:
    respectively performing a pivot calibration processing on the images to be calibrated and the datum image, wherein the pivot calibration processing performs a calculation according to a pivot matrix; and
    calculating the images to be calibrated after the pivot calibration processing to obtain the homography matrices of each of the images to be calibrated corresponding to the datum image after the pivot calibration processing.

4. The system for generating the multiview stereoscopic image according to claim 3, wherein the pivot matrix is respectively an inverse matrix of centers of homogenous coordinates of the images to be calibrated, and the pivot calibration processing further comprises a compensation matrix, wherein the compensation matrix is respectively a translation matrix of central points of the images to be calibrated.

5. The system for generating the multiview stereoscopic image according to claim 1, wherein outputting the multiview stereoscopic image comprises that the processor is further configured for:
    performing an interpolation calculation on the datum image and every two images adjacent to each other in the calibrated images to obtain a plurality of virtual images;
    outputting the multiview stereoscopic image, wherein the multiview stereoscopic image comprises the datum image, the calibrated images, and the virtual images.

6. The system for generating the multiview stereoscopic image according to claim 1, wherein outputting the multiview stereoscopic image comprises that the processor is further configured for:
    respectively performing a translation processing on the calibrated images to obtain a plurality of calibrated images after the translation processing, wherein the calibrated images and the datum image are arranged in order according to relative positions of the corresponding image capturing apparatuses, and the translation processing is that the calibrated images are multiplied by N translation matrices according to N relative distances between the calibrated images and the datum image; and
    outputting the multiview stereoscopic image comprising the calibrated images after the translation processing and the datum image.

7. The system for generating the multiview stereoscopic image according to claim 5, wherein outputting the multiview stereoscopic image comprises that the processor is further configured for:
    respectively performing a translation processing on the calibrated images and the virtual images to obtain a plurality of calibrated images after the translation processing and a plurality of virtual images after the translation processing, wherein the calibrated images, the datum image, and the virtual images are arranged in order according to relative positions of the corresponding image capturing apparatuses, and the translation processing is that the calibrated images and the virtual images are multiplied by N translation matrices according to N relative distances between the calibrated images and the virtual images, and the datum image; and
    outputting the multiview stereoscopic image comprising the calibrated images after the translation processing, the virtual images after the translation processing, and the datum image.

8. The system for generating the multiview stereoscopic image according to claim 1, wherein when a number of the image capturing apparatuses is an odd number, the datum image is the image captured by the image capturing apparatus located in a middle of the image capturing apparatuses.

9. The system for generating the multiview stereoscopic image according to claim 1, wherein when a number of the image capturing apparatuses is an even number, the datum image is the image obtained by performing an interpolation calculation on the two images captured by the two image capturing apparatuses located in a middle of the image capturing apparatuses.

10. A method for generating a multiview stereoscopic image, comprising:
respectively capturing, by a plurality of image capturing apparatuses, a plurality of images with a real calibration panel;
receiving, by a processor, the images captured by the image capturing apparatuses to obtain a datum image and a plurality of images to be calibrated in the images;
respectively calculating, by the processor, a plurality of homography matrices of each of the images to be calibrated corresponding to the datum image according to the datum image and the images to be calibrated;
respectively performing, by the processor, a matrix disassembly calculation on each of the homography matrices according to the homography matrices to obtain a calibration matrix of each of the homography matrices;
based on the calibration matrix, respectively performing, by the processor, a calibration calculation on the images to be calibrated to obtain a plurality of calibrated images; and
outputting, by the processor, the multiview stereoscopic image, wherein the multiview stereoscopic image comprises the datum image and the calibrated images.

11. The method for generating the multiview stereoscopic image according to claim 10, wherein respectively performing, by the processor, the matrix disassembly calculation on each of the homography matrices according to the homography matrices to obtain the calibration matrix of each of the homography matrices further comprises:
disassembling, by the processor, each of the homography matrices into a perspective matrix, a similarity matrix, and an affine matrix by performing the matrix disassembly calculation; and
using, by the processor, the similarity matrix and the affine matrix as the calibration matrix.

12. The method for generating the multiview stereoscopic image according to claim 10, wherein respectively calculating the homography matrices of each of the images to be calibrated corresponding to the datum image according to the datum image and the images to be calibrated further comprises:
respectively performing, by the processor, a pivot calibration processing on the images to be calibrated and the datum image, wherein the pivot calibration processing performs a calculation according to a pivot matrix; and
calculating, by the processor, the homography matrices of each of the images to be calibrated after the pivot calibration processing corresponding to the datum image after the pivot calibration processing.

13. The method for generating the multiview stereoscopic image according to claim 12, wherein the pivot matrix is respectively an inverse matrix of centers of homogenous coordinates of the images to be calibrated, and the pivot calibration processing further comprises a compensation matrix, wherein the compensation matrix is respectively a translation matrix of central points of the images to be calibrated.

14. The method for generating the multiview stereoscopic image according to claim 10, wherein outputting the multiview stereoscopic image further comprises:
performing, by the processor, an interpolation calculation on the datum image and every two images adjacent to each other in the calibrated images to obtain a plurality of virtual images;
outputting, by the processor, the multiview stereoscopic image, wherein the multiview stereoscopic image comprises the datum image, the calibrated images, and the virtual images.

15. The method for generating the multiview stereoscopic image according to claim 10, wherein outputting the multiview stereoscopic image further comprises:
respectively performing, by the professor, a translation processing on the calibrated images to obtain a plurality of calibrated images after the translation processing, wherein the calibrated images and the datum image are arranged in order according to relative positions of the corresponding image capturing apparatuses, and the translation processing is that the calibrated images are multiplied by N translation matrices according to N relative distances between the calibrated images and the datum image; and
outputting, by the processor, the multiview stereoscopic image comprising the calibrated images after the translation processing and the datum image.

16. The method for generating the multiview stereoscopic image according to claim 14, wherein outputting the multiview stereoscopic image further comprises:
respectively performing, by the processor, a translation processing on the calibrated images and the virtual images to obtain a plurality of calibrated images after the translation processing and a plurality of virtual images after the translation processing, wherein the calibrated images, the datum image, and the virtual images are arranged in order according to relative positions of the corresponding image capturing apparatuses, and the translation processing is that the calibrated images and the virtual images are multiplied by N translation matrices according to N relative distances between the calibrated images and the virtual images, and the datum image; and
outputting, by the processor, the multiview stereoscopic image comprising the calibrated images after the translation processing, the virtual images after the translation processing, and the datum image.

17. The method for generating the multiview stereoscopic image according to claim 10, wherein a number of the image capturing apparatuses is an odd number, the datum image is the image captured by the image capturing apparatus located in a middle of the image capturing apparatuses.

18. The method for generating the multiview stereoscopic image according to claim 10, wherein when a number of the image capturing apparatuses is an even number, the datum image is the image obtained by performing an interpolation calculation on the two images captured by the two image capturing apparatuses located in a middle of the image capturing apparatuses.

* * * * *